US012705087B2

(12) United States Patent
Bos et al.

(10) Patent No.: US 12,705,087 B2
(45) Date of Patent: Aug. 11, 2026

(54) SCHEDULE UNPLANNABLE WORKLOAD VIA STATIC RUNTIME

(71) Applicant: SAP SE, Walldorf (DE)

(72) Inventors: Daniel Bos, Beijing (CN); Yue Sun, Beijing (CN); Tobias Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 486 days.

(21) Appl. No.: 18/359,751

(22) Filed: Jul. 26, 2023

(65) Prior Publication Data

US 2025/0036454 A1 Jan. 30, 2025

(51) Int. Cl.

*G06F 9/46* (2006.01)
*G06F 9/48* (2006.01)
*G06F 16/25* (2019.01)

(52) U.S. Cl.

CPC .......... *G06F 9/4831* (2013.01); *G06F 16/254* (2019.01)

(58) Field of Classification Search

None

See application file for complete search history.

(56) References Cited

U.S. PATENT DOCUMENTS

2011/0040737 A1* 2/2011 Guldner .............. G06F 16/2329 707/E17.03
2017/0242596 A1* 8/2017 Liu ......................... G06F 3/061
2020/0371835 A1* 11/2020 Chuang ................. G06F 9/4881
2023/0017127 A1 1/2023 Karpstein et al.

OTHER PUBLICATIONS

U.S. Appl. No. 17/672,141, filed Feb. 15, 2022.

* cited by examiner

*Primary Examiner* — Bing Zhao

(74) *Attorney, Agent, or Firm* — Sterne, Kessler, Goldstein & Fox P.L.L.C.

(57) ABSTRACT

Disclosed herein are system, method, and computer program product embodiments for scheduling an unplannable workload via a static runtime. An ingestion service operating on a computing device establishes an inbound channel based on a setup order and associate the inbound channel to an Ingestion-Transformation-Load (ITL) task. The ingestion service stores incoming data received via the inbound channel in a staging area and organizes the incoming data into a plurality of batches. The ingestion service monitors the staging area to determine a number of unprocessed batches. Furthermore, in response to determining that the number of unprocessed batches meets or exceeds a first predetermined threshold, the ingestion service triggers a scheduler to generate a work order to be executed on runtime instance for each of the plurality of batches in the staging area.

20 Claims, 7 Drawing Sheets

300

| Status Table: 302 | | |
|---|---|---|
| ITL Task ID 304 | Batch ID 306 | Batch Status 308 |
| Itl-a | 1 | in progress |
| Itl-a | 2 | new |
| Itl-b | 3 | in progress |

FIG. 3A

| Data Table: 310 | | |
|---|---|---|
| Batch ID 306 | Position 312 | Data314 |
| 1 | 1 | {…} |
| 1 | 2 | {…} |
| 1 | 3 | {…} |
| 2 | 1 | {…} |
| ... | ... | ... |

FIG. 3B

SCHEDULE UNPLANNABLE WORKLOAD VIA STATIC RUNTIME

BACKGROUND

Extract-Transform-Load (E-T-L) processes can include reading data from a source system, transforming the data from a first representation to a second representation, and loading the transformed data in a target system. A static runtime can be used to achieve low total cost of ownership heterogeneous E-T-L processes by using a controller that splits up each workload into dynamic work orders, and a scheduler that determines when each work order is executed by the static runtime. Such processes work well for traditional E-T-L workloads, where source data is readily available and can be analyzed to determine an optimal set of work orders and the sequence in which the work orders should be executed. However, none of these conditions hold true for Ingest-Transform-Load (I-T-L) workloads, where the source data is unknown and can be pushed to a system processing the workload at any time, frequency, or volume.

A common use-case for I-T-L workloads is the processing of business data events, such as a customer placing an order or updating their shipping address. These types of workloads are inherently unplannable because they can arrive at any time. Traditional approaches of solving this unpredictability include reserving processing capacity and having a process running on stand-by to process the incoming data. While the cost of this approach may be acceptable when the stream of incoming data of a specific type is consistent, the approach becomes problematic when incoming data only comes in bursts such that reserved processing capacity mostly sits idle or when the number of different data types requires a corresponding large amount of reserved processing capacity. Accordingly, what is needed is an improved method and system for efficiently processing unplannable workloads.

BRIEF DESCRIPTION OF THE DRAWINGS

The accompanying drawings are incorporated herein and form a part of the specification.

FIGS. 3A and 3B are block diagrams of example staging tables, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for scheduling an unplannable workload via static runtime.

Figure 1:
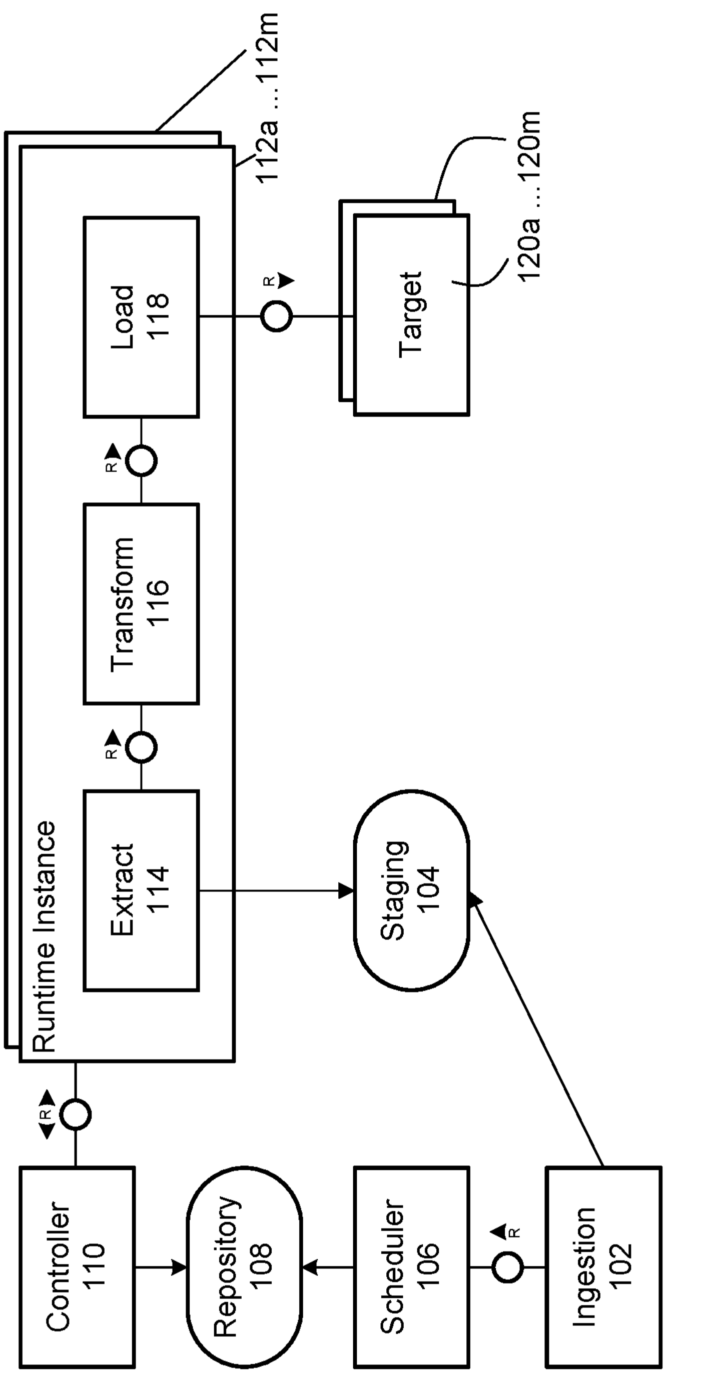
FIG. 1 is a block diagram of an example E-T-L system to schedule an unplannable workload via static runtime, according to some embodiments.

FIG. 1 is a block diagram of an example E-T-L system 100 to schedule an unplannable workload via static runtime, according to some embodiments. As shown in FIG. 1, the I-T-L system 100 may include an ingestion service 102, a staging area 104, a scheduler 106, a repository 108, a controller 110 and runtime instances 112 *a*-112 *m*. Furthermore, according to some embodiments, the E-T-L system 100 may also be coupled to one or more target systems 120 *a*-120 *m*.

In some embodiments, ingestion service 102 may receive incoming data from one or more ingestion channels (e.g., an endpoint for a Representational state Transfer (REST) Application Programming Interface (API) or an event broker) for any of the required data types and store the incoming data in a staging area 104. The incoming data may include, but is not limited, information received from a customer or entity, such as request to change or update existing information for the customer or entity (e.g., shipping address) or an online purchase order. The ingestion service 102 may also sort incoming data by type (e.g., event type) and organize the data into batches in the staging area 104. For example, in some cases, the ingestion service 102 may add incoming data to a current batch when the associated customer or entity is not present in the current batch. In other cases, the ingestion service 102 may create a new batch and add the incoming data to the new batch when the associated customer or entity is already present in the current batch. Furthermore, ingestion service 102 may also periodically (or continuously) monitor the staging area 104. In some embodiments, ingestion service 102 may create a status table and/or data table for an I-T-L task. The ingestion service 102 may further monitor the status table and/or data table to manage the size of staging area 104, discard incoming data with unknown event types, and remove the data for batches that have been uploaded completely. The ingestion service 102 may also monitor the status table to determine the number of unprocessed batches in the staging area 104. If the number of unprocessed batches meets or exceeds a first predetermined threshold (e.g., a high-water mark), the ingestion service 102 may trigger the scheduler 106 to generate a work order for each of the remaining, unprocessed batches of data. In some examples, ingestion service 102 may trigger the scheduler 106 to generate work orders by transmitting a signal or command to do so to scheduler 106.

In some embodiments, staging area 104 may collect and store incoming data received by ingestion service 102. As mentioned earlier, the incoming data stored in the staging area 104 may be sorted according to event type and organized into batches. Staging area 104 may act as a shared persistency between the ingestion service 102 and the runtime instance(s) that process the data. Staging area 104 may include any data storage/repository device, such as, but not limited to, a relational database, memory cache, file store, and the like.

In some embodiments, scheduler 106 may generate a work order for each of one or more unprocessed batches of data in staging area 104. A work order may describe the work or operation that is to be completed for a specific E-T-L process. The scheduler may be prompted to generate work orders when the number of new or unprocessed batches meets or exceeds a first predetermined threshold (e.g., a high-water mark). The scheduler 106 may further assign metadata to each work order, which may include, but is not limited to, one or more of work order type, identifier, sequence number, priority number, concurrency information, target information, transformation information, and the like. Furthermore, in some cases, the scheduler 106 may derive some of the metadata for a work order based on data from previous work orders.

Work order type may include, but is not limited to, transfer type, setup type, cleanup type, and the like. Identifier may include a unique identifier for a work order. Sequence number and/or priority number may indicate the order in which work orders are to be executed. Concurrency information may include information indicating whether two or more works are to be executed in parallel.

The target information may include a target type that indicates the type of the target system. The target information may also include connection information for connecting to the target system. The connection information may include, but is not limited to, information associated with a protocol, a hostname, a port, a username, a password, and the like. The target information may also include container information including information regarding a subsystem within the target system (e.g., a database schema). The target information may also include object information including an identifier for a target subject. The identifier for the target subject may include, but is not limited to the name of a table within a database, a topic within a message broker, and the like. The target information may also include schema information including a description of the schema of the target data including, for example, the names of the fields and their types in an appropriate format. The target information may also include range information including a description of the records that are to be extracted (e.g., a Structured Query Language (SQL) condition or other specification appropriate for the target system). The target information may also include one or more metrics such as, but not limited to, a number of records, a record size (e.g., in bytes), a processing time (e.g., in milliseconds), a memory usage (e.g., in megabytes (MBs)), and the like. The target information may include other, more, or less information.

The transformation information may include a transformation type indicating the type of the transformation. The transformation type may include, but is not limited to, "identity" (e.g., do nothing), "filter/projection," "script," "rules,", and the like. The transformation information may also include filter description in an appropriate format (e.g., SQL, JavaScript Object Notation (JSON) encoded, and the like). The transformation information may also include projection description in an appropriate format (e.g., a list of output fields in an order, with an optional mapping from input field name to output field name, and the like). The transformation information may also include user-defined script to transform the data in an appropriate format (e.g., a Python sandbox script, and the like).

In some embodiments, repository 108 may store work orders previously generated by scheduler 106. Repository 108 may include any data storage/repository device, such as, but not limited to, in-memory, a queue, a buffer, a database, and the like.

In some embodiments, controller 110 may read (e.g., pull) the work order(s) from repository 108 for executing the work order(s). Controller 110 may generate one or more runtime instances 112 *a*-112 *m* from a runtime template and based on the metadata of the work order(s). A runtime instance may be a fully prepared environment with all the necessary components into which work orders can be injected. A runtime instance may, for example, be a single application or a set of micro-services that are loaded into a distributed cluster. Furthermore, a runtime template may further describe and define the composition of a runtime instance (e.g., extract, transform, load, or other modules and processes). Controller 110 may also assign the work order to an existing runtime instance (e.g., runtime instance 112 *a*) based on the metadata of the work order and/or one or more parameters of the E-T-L system (e.g., available computation resources, performance, etc.). After assigning the work order to a runtime instance 112 *a*, controller 110 may execute the work order on the runtime instance 112 *a*. In some cases, executing the work order on runtime instance 112 *a* may include extracting data from the staging area 104, transforming the extracted data, and loading the transformed data to a target system 120. In other cases, executing the work order on runtime instance 112 *a* may also include updating the runtime instance 112 based on information associated with the work order. Furthermore, controller 110 may additionally start or stop runtime instances 112 *a*-112 *m* based on one or more parameters to balance performance, computational resource usage, and/or costs.

In some embodiments, the controller 110 may monitor and track the execution of the work order on runtime instance 112 *a*. For example, controller 110 may update the status (e.g., success, failure, in progress, or suspended) in repository 108. The controller 110 may add this information in repository 108 separately and/or by updating metadata of the work order. Furthermore, depending on the execution of the work order on runtime instance 112 *a*, some data associated with the work order may change. Controller 110 can monitor these changes and update the work order in repository 108. Scheduler 106 can access and read the changes and/or the updated work order. Additionally, or alternatively, scheduler 106 can generate additional work order(s) based on the changes and/or the update work order.

In some embodiments, each of runtime instances 112 *a*-112 *m* may include common logic and processes associated with an E-T-L process. Each of runtime instances 112 may include an extract module 114, a transform module 116, and a load module 118. Although runtime instances 112 are described with respect to extract module 114, a transform module 116, and a load module 118, the embodiments of this disclosure are not limited to these examples, and runtime instances 112 may be applied to other processes.

Furthermore, as discussed above, runtime instances 112 *a*-112 *m* may be generated by controller 110 from a runtime template and based on the work orders in repository 108. In some embodiments, controller 110 may generate or start multiple runtime instances from one runtime template. However, in other embodiments, controller 110 may generate runtime instances 112 *a*-112 *m* from more than one runtime template.

In some examples, each runtime instance 112 may be associated with a corresponding work order read by controller 110. In other words, controller 110 may generate one runtime instance for each work order. Additionally, or alternatively, controller 110 may generate one runtime instance for two or more (such as, but not limited to, hundreds or thousands of) work orders.

Based on the work order that is read by controller 110 and is assigned to and executed on runtime instance 112 *a*, extract module 114 may extract a batch of data specified by (or otherwise associated with) the work order and sends it to the transform module 116 for further processing. If no new batch is available, or alternatively, if the number of available, unprocessed batches crosses a second predetermined threshold (e.g., a low-water mark), the extract module 114 may set the work order status to "suspend." Upon receiving the updated work order status, controller 110 may transmit a signal instructing the scheduler 106 to pause the creation of new work orders and wait for a signal to being generating work orders from ingestion service 102. Alternatively, controller 110 may transmit a signal instructing the scheduler 106 to stop creation of new work orders for a set amount of time. Transform module 116 of runtime instance 112 *a* may perform a transformation specified by the work order. Load module 118 may further load (e.g., write, store, and the like) the transformed data in one or more of target systems 120 *a*-120 *m* (e.g. databases, object stores, file systems, message broker) as specified in the work order.

Figure 2:
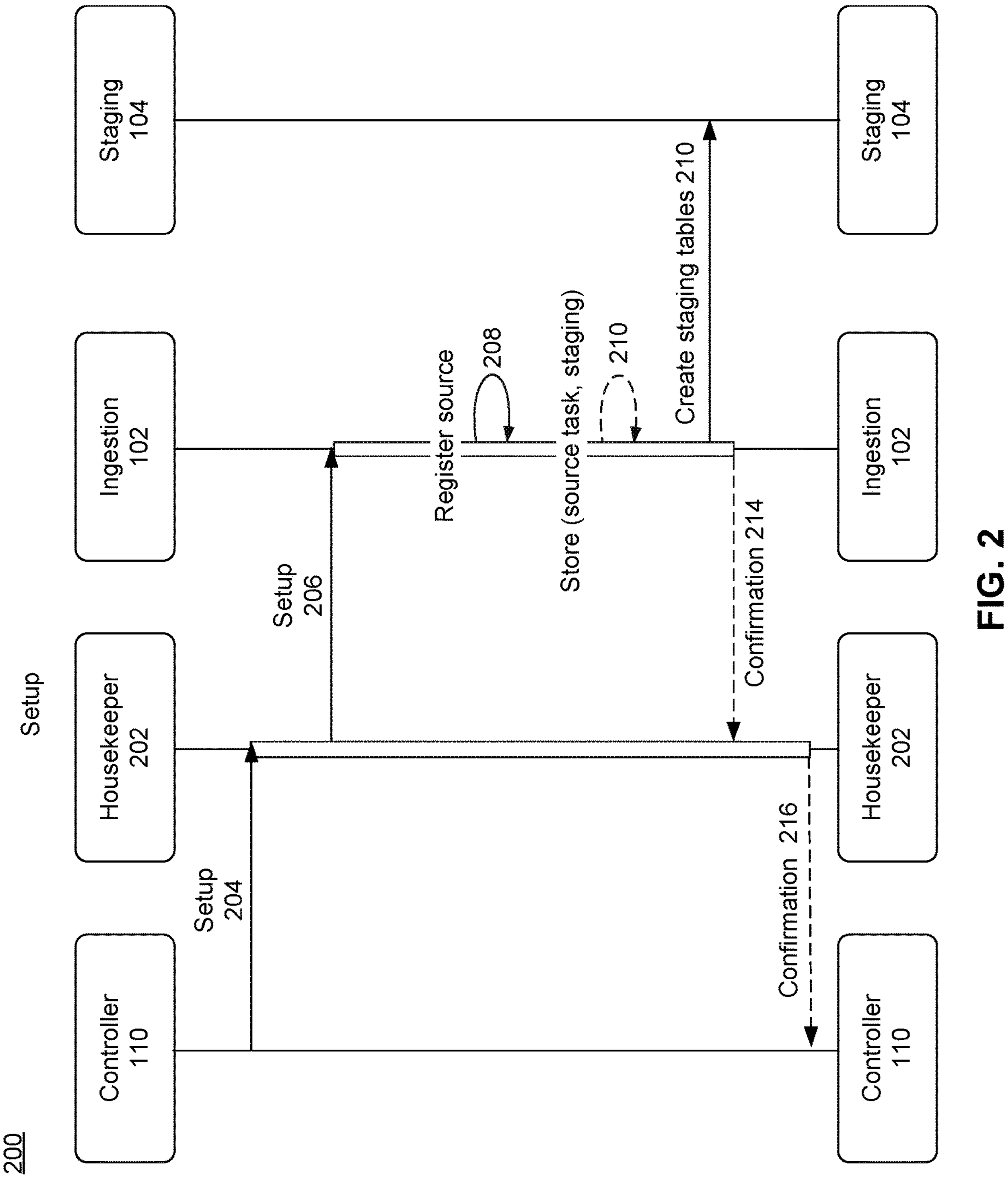
FIG. 2 is a flow diagram of an example message flow between components of an exemplary E-T-L system to setup an ingestion service, according to some embodiments.

FIG. 2 is a flow diagram of an example message flow between components of an exemplary E-T-L system to execute setup orders, according to some embodiments. The various steps of flow diagram 200 can be omitted, rearranged, combined, or adapted without deviating from the scope of the present disclosure. Flow diagram 200 can be performed by processing logic that can comprise hardware (e.g., circuitry, dedicated logic, programmable logic, microcode, etc.), software (e.g., instructions executing on a processing device), or a combination thereof.

In some embodiments, flow diagram 200 may begin with message flow 204, which may include the controller 110 transmit a request for a setup order to housekeeper 202. In some embodiments, controller 110 may automatically transmit a request for a setup order to housekeeper 202 upon the creation of the I-T-L task.

In some embodiments, message flow 206 may include the housekeeper 202 generating and transmitting the requested setup order to ingestion service 102. The setup order may contain the necessary information to start or establish an inbound channel through which the ingestion service may receive data or events. For example, the setup order may contain credentials and configurations for connecting to a specific event broker or a REST API specification for an endpoint that the ingestion service 102 needs to expose. As depicted by message flow 208, ingestion service may use the information in the setup order to create an inbound channel and associate the channel with an I-T-L task. Furthermore, as displayed by message flow 210, the ingestion service may store the relationship between one or more registered events and the I-T-L task.

In some embodiments, message flow 212 may include the ingestion service 102 creating staging tables in staging area 104. The staging tables may include a status table and/or data table for a specific I-T-L task. As mentioned earlier, the ingestion service 102 may monitor the status table and/or data table in order to manage the size of staging area 104, discard incoming data with unknown event types from staging area 104, determine the number of unprocessed batches in the staging area 104, and remove data from the staging area 104 for batches that have been completely loaded to a target system.

In some embodiments, message flow 214 may include ingestion service 102 sending confirmation of a successful setup of the ingestion service 102 to housekeeper 202. In some embodiments, message flow 216 may include housekeeper relaying confirmation of the successful setup of ingestion service 102.

FIGS. 3A and 3B are block diagrams of example staging tables, according to some embodiments. As shown in FIG. 3A, status table 302 may include an I-T-L task identifier (ID) 304, batch ID 306, and batch status 308. I-T-L task ID 304 may include an identifier for a specific I-T-L task. Batch ID 306 may include an identifier assigned to a particular batch of incoming data. Batch Status 308 may include information indicating the status of a batch of incoming data associated with a work order processed by a runtime instance. When the extract module 114 begins processing a batch, extract module 114 may set the batch status 308 to "in progress." When the batch has been processed completely, extract module 114 may set the batch status 308 to "loaded," and the batch of data may be removed from staging area 104. Furthermore, as shown in FIG. 3B, staging tables may also include a data table 310. Data tables, such as data table 310, may be created for each I-T-L task to avoid lock contention in scenarios where a large number of concurrent I-T-L tasks are active. Data table 310 may include batch ID 306, position 312, and data 314. Batch ID 306 may be a reference number or identifier that identifies a batch of incoming data. Position 312 may be a natural number that allows for the temporal order of changes with the specific batch. Position 312 parameter may be useful in some cases when the target of the I-T-L task is itself again used as a source for a subsequent replication task. Data 314 may be the actual data payload (e.g., request change or update to existing customer information) received by ingestion service 102.

Figure 4:
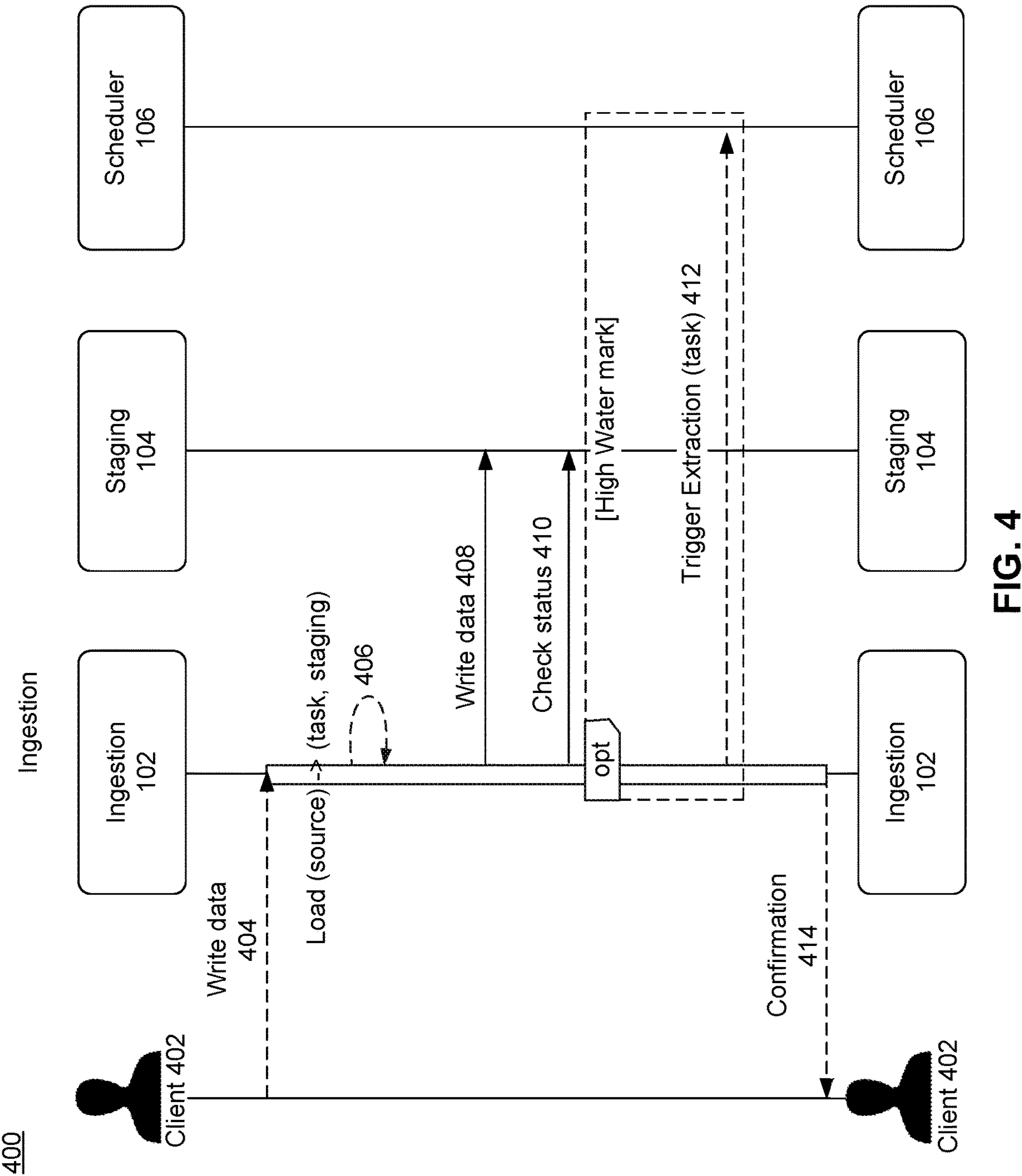
FIG. 4 is a flow diagram of an example message flow between components of an exemplary E-T-L system to ingest incoming data, according to some embodiments.

FIG. 4 is a flow diagram 400 of an example message flow between components of an exemplary E-T-L system to ingest incoming data, according to some embodiments. The various steps of flow diagram 400 can be omitted, rearranged, combined, or adapted without deviating from the scope of the present disclosure. Flow diagram 400 can be performed by processing logic that can comprise hardware (e.g., circuitry, dedicated logic, programmable logic, microcode, etc.), software (e.g., instructions executing on a processing device), or a combination thereof.

In some embodiments, flow diagram 400 may begin with message flow 404, which may include the ingestion service 102 receiving incoming data from client 402. Client 402 may include one or more customers or entities, and incoming data may include requests to change or update existing information for the customer or entity (e.g., shipping address) or an online purchase order. In some embodiments, incoming data may also include requests to create one or more new customer records or to delete one or more existing customer records. In some embodiments, message flow 406 may include a loop for the ingestion service 102 repeatedly collecting incoming data from client 402. As mentioned earlier, the ingestion service 102 may receive incoming data at any time, frequency, or volume.

In some embodiments, message flow 408 may include the ingestion service 102 writing the incoming data to the staging area 104. The ingestion service 102 may also sort the incoming data by event type and organize the data into batches in the staging area 104. For example, in some cases, the ingestion service 102 may add incoming data to a current batch when the associated customer or entity is not present in the current batch. In other cases, the ingestion service 102 may create a new batch and add the incoming data to the new batch when the associated customer or entity is already present in the current batch.

In some embodiments, message flow 410 may include the ingestion service 102 monitoring the status of staging area 104 and/or the incoming data stored in the staging area 104. The ingestion service 102 may create a status table and/or data table for an I-T-L task. The ingestion service 102 may monitor the status table and/or data table to manage the size of staging area 104, discard incoming data with unknown event types, and remove the data for batches that have been uploaded completely. The ingestion service 102 may also monitor the number of processed and unprocessed batches in the staging area 104.

In some embodiments, message flow 412 may include the ingestion service 102 triggering scheduler 106 to generate a work order for each unprocessed batch in the staging area 104. For example, ingestion service 102 may transmit a request to scheduler 106 to generate work orders when the number of unprocessed batches in repository 108 meets or exceeds a first predetermined threshold (e.g., a high-water mark). Alternatively, or in addition to the first predetermined threshold, ingestion service 102 may transmit a request to scheduler 106 to start or resume the generation of work orders after a predefined time period (e.g., an amount time that has elapsed subsequent to the suspension of the runtime instance). In some embodiments, the ingestion service 102 may also transmit a request to schedule 106 to generate work orders for the I-T-L task until the scheduler 106 receives a "suspend" signal from controller 110 when the number of unprocessed batches in repository 108 meets or falls below a second predetermined threshold (e.g., low water mark). Furthermore, in some embodiments, the second predetermined threshold may be based on criteria other than the number of unprocessed batches in repository 108. For example, the second predetermined threshold may be established based on processing latency or the age of the oldest batch in the repository.

Figure 5:
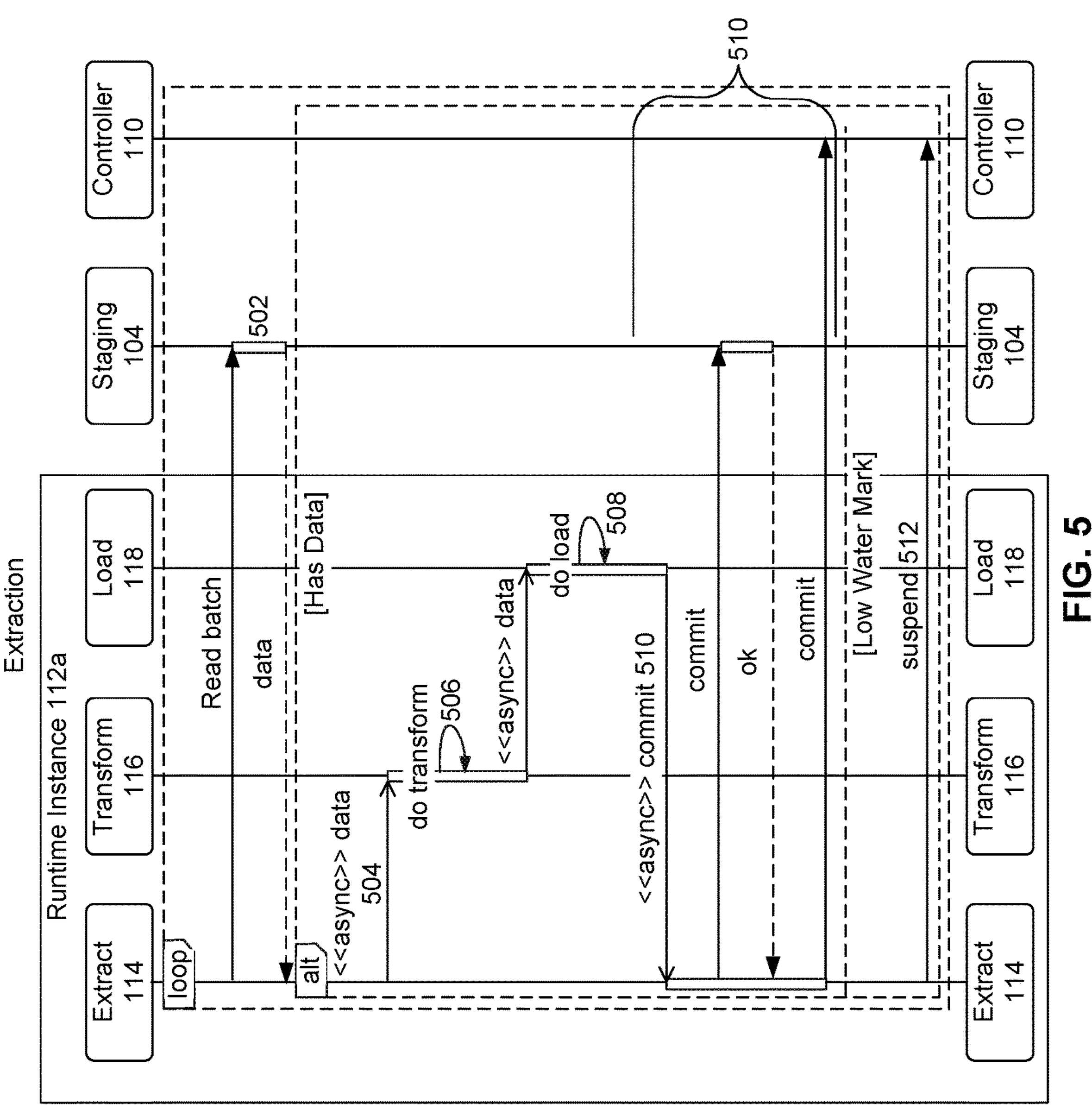
FIG. 5 is a flow diagram of example message flow between components of an exemplary E-T-L system to execute work orders on a runtime instance, according to some embodiments.

FIG. 5 is a flow diagram 500 of an example message flow between components of an exemplary E-T-L system to execute a work order on a runtime instance, according to some embodiments. The various steps of flow diagram 500 can be omitted, rearranged, combined, or adapted without deviating from the scope of the present disclosure. Flow diagram 500 can be performed by processing logic that can comprise hardware (e.g., circuitry, dedicated logic, programmable logic, microcode, etc.), software (e.g., instructions executing on a processing device), or a combination thereof.

In some embodiments, flow diagram 500 may begin with message flow 502, which may include the extract module 114 of runtime instance 112 *a* obtaining a batch of incoming data from staging area 104 that is associated with the work order assigned to the runtime instance 112 *a*. As previously discussed, a work order may be assigned to a specific runtime instance (e.g., runtime instance 112 *a*) based, at least in part, on the metadata of the work order.

In some embodiments, message flow 504 may include the extract module 114 transmitting the obtained batch of data to the transform module 116 of runtime instance 112 *a*. The transform module 116 of runtime instance 112 *a* may transform the obtained batch of data from an initial form or format to another form or format according to transformation information specified in the work order.

In some embodiments, message flow 506 may include the transform module 116 transmitting the transformed data to the load module 118 of runtime instance 112 *a*. The load module 116 may further load or transmit the transformed data to a target system 120.

In some embodiments, message flow 508 may include the controller 110 monitoring and recording changes in data elements of the batch of data associated with the work order as the work order is executed by runtime instance 112 *a*. Message flow 508 may also include the controller 110 receiving a signal from extract module 114 of runtime instance 112 *a* indicating that the runtime instance is suspended. In this case, message flow 508 may further include controller 110 subsequently transmitting a request to scheduler 106 to again begin generating work orders when the number of unprocessed batches in repository 108 meets or exceeds a first predetermined threshold (e.g., a high-water mark).

In some embodiments, message flow 510 may include the extract module 114 of the runtime instance 112 *a* determining the number of unprocessed batches remaining in the staging area 104. In cases where the number of unprocessed batches fall below a second predetermined threshold (e.g., a low water mark), extract module 114 of the runtime instance 112 *a* may set the work order status in the metadata of the work order to "suspend." As mentioned earlier, controller 110 may monitor and track the execution of the work order on runtime instance 112 *a*. Upon receiving the updated status, the controller 110 may instruct the scheduler 106 to temporarily pause the creation of new work orders.

Figure 6:
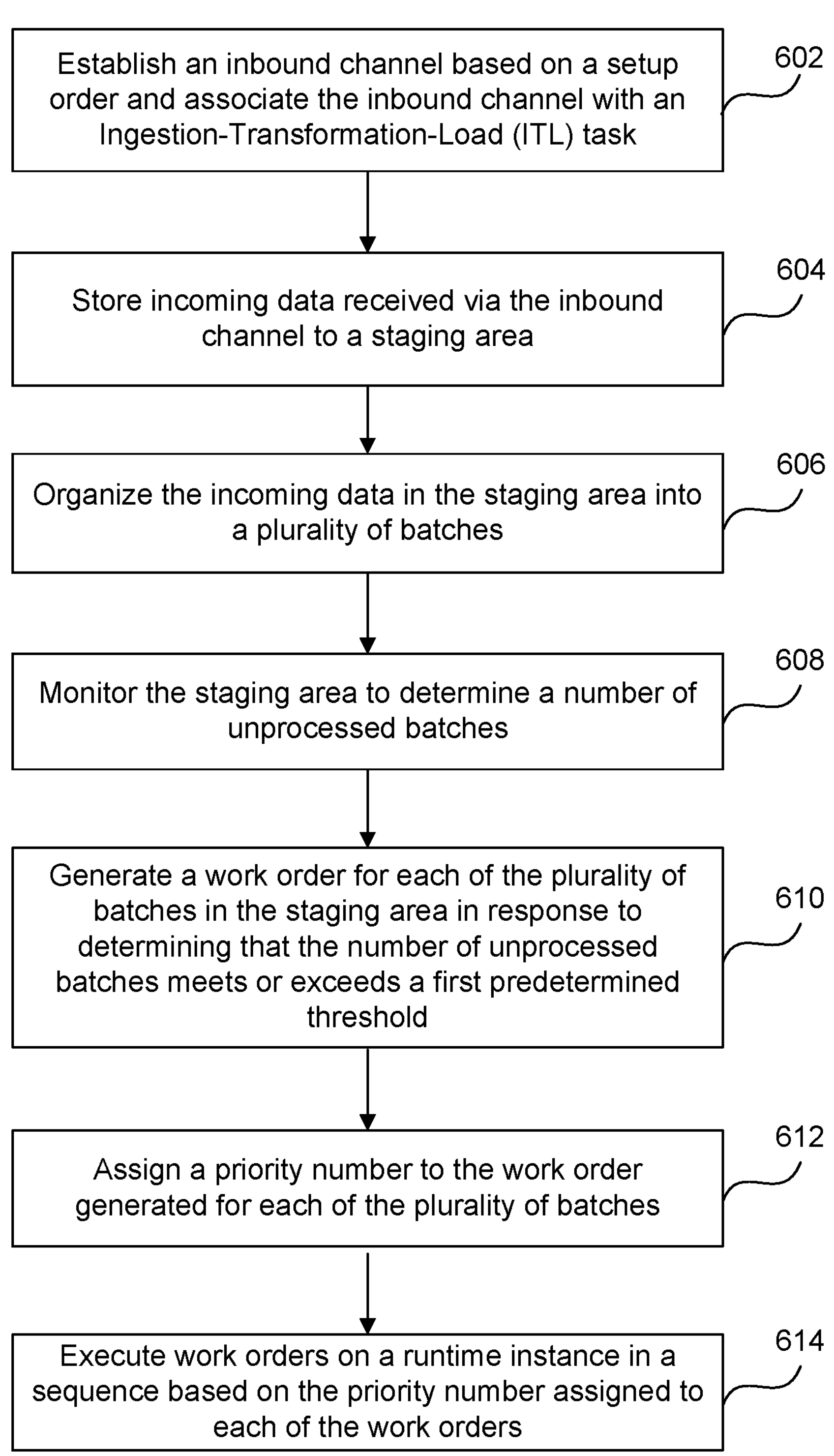
FIG. 6 is a flowchart of an example method for ingesting incoming data by an ingestion service, according to some embodiments.

FIG. 6 is a flowchart of an example method 600 for ingesting incoming data by an ingestion service, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIGS. 1-4. However, method 600 is not limited to that embodiment.

In 602, the ingestion service 102 may establish an inbound channel based on a setup order and associating the inbound channel with a specific Ingestion-Transformation-Load (I-T-L) task. In some embodiments, the ingestion service 102 may use information contained in a setup order to establish an inbound channel through which the ingestion service may receive data or events. For example, the setup order may contain credentials and configurations for connecting to a specific event broker or a REST API specification for an endpoint that the ingestion service 102 needs to expose. Furthermore, the ingestion service may also store the relationship between one or more registered events and the I-T-L task.

In 604, the ingestion service 102 may store incoming data received from a customer or entity via the inbound channel to staging area 104. As previously discussed, incoming data may include requests to change or update existing information for the customer or entity (e.g., shipping address) or an online purchase order.

In 606, the ingestion service 102 may organize the incoming data in staging area 104 into a plurality of batches. In some embodiments, the ingestion service 102 may sort incoming data by type (e.g., event type) and organize the data into batches in the staging area 104. For example, in some cases, the ingestion service 102 may add incoming data to a current batch when the associated customer or entity is not present in the current batch. In other cases, the ingestion service 102 may create a new batch and add the incoming data to the new batch when the associated customer or entity is already present in the current batch.

In 608, the ingestion service 102 may monitor the staging area 104 to determine a number of unprocessed batches of data. In some embodiments, the ingestion service 102 may create a status table and/or data table for an I-T-L task. The ingestion service 102 may further monitor the status table to manage the size of staging area 104, discard incoming data with unknown event types, and remove the data for batches that have been uploaded completely. The ingestion service 102 may also monitor the status table to determine the number of unprocessed batches in the staging area 104.

In 610, the scheduler 106 may generate a work order for each of the plurality of batches in the staging area 104 in response to determining that the number of unprocessed batches meets or exceeds a first predetermined threshold. The first predetermined threshold may be any non-zero value established by a user or system default. Furthermore, in some embodiments, the ingestion service 102 may trigger or prompt the scheduler 106 to generate a work order for each batch in the staging area 104 in response to determining that the number of unprocessed batches meets or exceeds a high-water mark.

In 612, the scheduler 106 may assign a priority number to the work order generated for each of the plurality of batches. The priority number may indicate the order in which work orders are to be executed. In some embodiments, the scheduler 106 may be included in a broader set of metadata assigned to the work order that may include, but is not limited to, work order type, identifier, sequence number, concurrency information, target information, transformation information, and the like. In some cases, the scheduler 106 may derive some of the metadata for a work order based on data from previous work orders.

In 614, the controller 110 may execute the work orders on a runtime instance in a sequence based on the priority number assigned to each of the work orders. A runtime instance may be a fully prepared environment with all the necessary components into which work orders can be injected. For example, in some embodiments, a runtime instance may include an extract module 114, a transform module 116, and a load module 118. Further, execution of a work order on a runtime instance may at least include the extract module 114 extracting data from the staging area 104, the transform module 116 transforming the extracted data from one form or format to another form or format according to transformation information specified in the metadata of the work order, and loading the transformed data to a target system 120.

Figure 7:
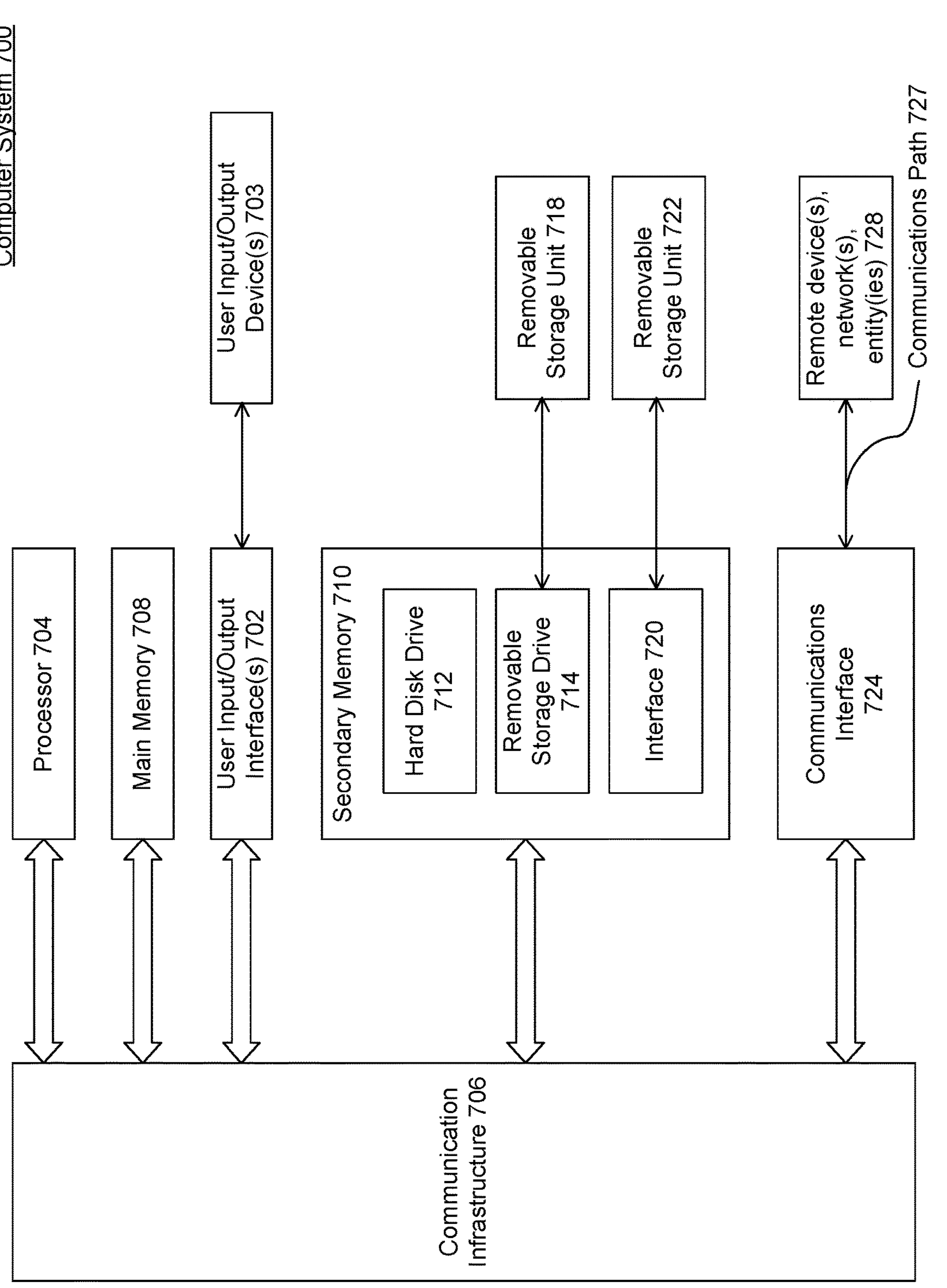
FIG. 7 is an example computer system useful for implementing various embodiments.

FIG. 7 illustrates an example computer system useful for implementing various embodiments in FIGS. 1-6.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for scheduling unplannable workloads via static runtime, comprising:
- establishing an inbound channel based on a setup order and associating the inbound channel to an Ingestion-Transformation-Load (ITL) task;
- storing incoming data received via the inbound channel to a staging area;
- organizing the incoming data in the staging area into a plurality of batches;
- monitoring the staging area to determine a number of unprocessed batches;
- generating a work order for each of the plurality of batches in the staging area in response to determining that the number of unprocessed batches meets or exceeds a first predetermined threshold;
- assigning a priority number to the work order generated for each of the plurality of batches;
- executing work orders on a runtime instance in a sequence based on the priority number assigned to each of the work orders; and
- removing data in a batch corresponding to the work order being executed on the runtime instance from the staging area when a status for the batch indicates that the batch has been processed and loaded to a target.

2. The computer-implemented method of claim 1, further comprising:
- pausing the generation of work orders in response to determining that all batches in the staging area have been processed.

3. The computer-implemented method of claim 1, further comprising:
- pausing the generation of work orders in response to determining that the number of unprocessed batches in the staging area is less than or equal to a second predetermined threshold.

4. The computer-implemented method of claim 3, further comprising resuming the generation of work orders after a predefined time period has elapsed.

5. The computer-implemented method of claim 1, wherein the incoming data comprises at least one change to existing data for an entity.

6. The computer-implemented method of claim 5, wherein the organizing the incoming data in the staging area into a plurality of batches further comprises:
- adding, by the ingestion service, the at least one change to the existing data for the entity to a current batch when the entity is not present in the current batch; or
- adding, by the ingestion service, the at least one change to the existing data for the entity to a new batch when the entity is present in the current batch.

7. A system for scheduling unplannable workloads via static runtime, comprising:
- at least one processor; and a memory storing instructions therein that, when executed by the at least one processor, cause the at least one processor to perform operations comprising:

establishing an inbound channel based on a setup order and associating the inbound channel to an Ingestion-Transformation-Load (ITL) task;

storing incoming data received via the inbound channel to a staging area;

organizing the incoming data in the staging area into a plurality of batches;

monitoring the staging area to determine a number of unprocessed batches; and generating a work order for each of the plurality of batches in the staging area in response to determining that the number of unprocessed batches meets or exceeds a first predetermined threshold;

assigning a priority number to the work order generated for each of the plurality of batches;

executing work orders on a runtime instance in a sequence based on the priority number assigned to each of the work orders; and removing data in a batch corresponding to the work order being executed on the runtime instance from the staging area when a status for the batch indicates that the batch has been processed and loaded to a target.

8. The system of claim 7, wherein the operations further comprise:

pausing the generation of work orders in response to determining that all batches in the staging area have been processed.

9. The system of claim 7, wherein the operations further comprise:

pausing the generation of work orders in response to determining that the number of unprocessed batches in the staging area is less than or equal to a second predetermined threshold.

10. The system of claim 9, wherein the operations further comprise: resuming the generation of work orders after a predefined time period has elapsed.

11. The system of claim 7, wherein the incoming data comprises at least one change to existing data for an entity.

12. The system of claim 11, wherein the organizing the incoming data in the staging area into a plurality of batches further comprises:

adding, by the ingestion service, the at least one change to the existing data for the entity to a current batch when the entity is not present in the current batch; or adding, by the ingestion service, the at least one change to the existing data for the entity to a new batch when the entity is present in the current batch.

13. A non-transitory computer-readable medium having instructions stored thereon that, when executed by at least one computing device, cause the at least one computing device to perform operations comprising:

establishing an inbound channel based on a setup order and associating the inbound channel to an Ingestion-Transformation-Load (ITL) task;

storing incoming data received via the inbound channel to a staging area;

organizing the incoming data in the staging area into a plurality of batches;

monitoring the staging area to determine a number of unprocessed batches; and generating a work order for each of the plurality of batches in the staging area in response to determining that the number of unprocessed batches meets or exceeds a first predetermined threshold;

assigning a priority number to the work order generated for each of the plurality of batches;

executing work orders on a runtime instance in a sequence based on the priority number assigned to each of the work orders; and removing data in a batch corresponding to the work order being executed on the runtime instance from the staging area when a status for the batch indicates that the batch has been processed and loaded to a target.

14. The non-transitory computer-readable medium of claim 13, wherein the operations further comprise:

pausing the generation of work orders in response to determining that all batches in the staging area have been processed.

15. The non-transitory computer-readable medium of claim 13, wherein the operations further comprise:

pausing the generation of work orders in response to determining that the number of unprocessed batches in the staging area is less than or equal to a second predetermined threshold.

16. The non-transitory computer-readable medium of claim 13, wherein the incoming data comprises at least one change to existing data for an entity.

17. The non-transitory computer-readable medium of claim 16, wherein the organizing the incoming data in the staging area into a plurality of batches further comprises:

adding, by the ingestion service, the at least one change to the existing data for the entity to a current batch when the entity is not present in the current batch; or adding, by the ingestion service, the at least one change to the existing data for the entity to a new batch when the entity is present in the current batch.

18. The computer-implemented method of claim 1, wherein the inbound channel comprises at least one of:

an endpoint for a Representational state Transfer (REST) Application Programming Interface (API); or an event broker.

19. The system of claim 7, wherein the inbound channel comprises at least one of:

an endpoint for a Representational state Transfer (REST) Application Programming Interface (API); or an event broker.

20. The non-transitory computer-readable medium of claim 13, wherein the inbound channel comprises at least one of:

an endpoint for a Representational state Transfer (REST) Application Programming Interface (API); or an event broker.

* * * * *